United States Patent
Kommer et al.

(10) Patent No.: US 12,307,389 B2
(45) Date of Patent: May 20, 2025

(54) PREDICTING EVENTS BASED ON TIME SERIES DATA

(71) Applicant: SAP SE, Walldorf (DE)

(72) Inventors: Christoph Kommer, Mannheim (DE); Jonathan von Rueden, Wiesbaden (DE); Susanne Beckers, Bad Schoenborn (DE); Franklin Herbas, Mountain View, CA (US); Paul Logue, Pleasanton, CA (US)

(73) Assignee: SAP SE, Walldorf (DE)

( * ) Notice: Subject to any disclaimer, the term of this patent is extended or adjusted under 35 U.S.C. 154(b) by 930 days.

(21) Appl. No.: 17/466,682

(22) Filed: Sep. 3, 2021

(65) Prior Publication Data

US 2023/0073643 A1 Mar. 9, 2023

(51) Int. Cl.
*G06N 7/01* (2023.01)
*G06F 16/28* (2019.01)

(52) U.S. Cl.
CPC ........... *G06N 7/01* (2023.01); *G06F 16/285* (2019.01)

(58) Field of Classification Search
CPC ......... G06N 7/01; G06N 20/00; G06F 16/285
See application file for complete search history.

(56) References Cited

U.S. PATENT DOCUMENTS

| | | | |
|---|---|---|---|
| 2011/0016355 A1* | 1/2011 | Watanabe | G06F 11/2257 714/E11.029 |
| 2013/0290232 A1* | 10/2013 | Tsytsarau | G06N 5/027 706/46 |
| 2018/0082201 A1* | 3/2018 | Cantwell | G06F 11/079 |
| 2018/0150547 A1* | 5/2018 | Pallath | G06N 20/20 |
| 2019/0378619 A1* | 12/2019 | Meyer | G16H 50/70 |

* cited by examiner

*Primary Examiner* — Jennifer N Welch
*Assistant Examiner* — Amy P Hoang
(74) *Attorney, Agent, or Firm* — Fountainhead Law Group, PC

(57) ABSTRACT

Some embodiments provide a non-transitory machine-readable medium that stores a program. The program receives data from a set of data sources. Based on the data, the program further generates a time series data set that includes a plurality of data points. The program also determines a set of subsets of data points from the time series data set. The program further groups the set of subsets of data points into a set of clusters. The program also provides the set of clusters as input to a machine learning model to cause the machine learning model to determine a probability of an occurrence of an event based on the set of clusters.

8 Claims, 9 Drawing Sheets

Interest for Entity C (www.entityc.com)

Category A — 92
Category B — 97
Category C — 82
Category D — 84
Category E — 93
Category F — 99
Category G — 81

Category A
92
Very High Interest

Top Topics

| Rank | Topic |
|------|-------|
| 1 | Topic P |
| 2 | Topic D |
| 3 | Topic L |
| 4 | Topic R |
| 5 | Topic T |

Top Vendors

| Rank | Vendor |
|------|--------|
| 1 | Vendor Y |
| 2 | Vendor M |
| 3 | Vendor A |
| 4 | Vendor X |
| 5 | Vendor B |

FIG. 5

PREDICTING EVENTS BASED ON TIME SERIES DATA

BACKGROUND

The Information Age has allowed large amounts of information to be exchanged via the Internet. Users accessing information in this manner often times leave behind digital trails or digital footprints of their activities. Examples of digital trail or digital footprint data include email communications, messages posted on websites and social media, intent data, clickstream data, install base data, etc. Digital trail or digital footprint data can contain valuable information and/or insights about users. Therefore, third parties may collect this type of data and sell it. Information extracted from digital trail or digital footprint data can be leverage for many purposes. For instance, the information can be used for marketing purposes (e.g., determine which advertisements to show to which users, when to show advertisements to users, etc.), sales purposes (e.g., determine what products users may be interested in, generate sales leads, etc.), business purposes (e.g., determine market share of products and/or services, determine areas or industries to invest in, etc.), etc.

SUMMARY

In some embodiments, a non-transitory machine-readable medium stores a program executable by at least one processing unit of a device. The program receives data from a set of data sources. Based on the data, the program further generates a time series data set that includes a plurality of data points. The program also determines a set of subsets of data points from the time series data set. The program further groups the set of subsets of data points into a set of clusters. The program also provides the set of clusters as input to a machine learning model to cause the machine learning model to determine a probability of an occurrence of an event based on the set of clusters.

In some embodiments, the time series data set may be a first time series data set that includes a first plurality of data points. The program may further determine a subset of data points from a second time series data set that includes a second plurality of data points and determine a probability of similarity between the first time series data set and the subset of data points from the second time series data set. The program may further determine a score based on the probability of the occurrence of the event and the probability of similarity between the first time series data set and the subset of the data points from the second time series data set. The program may further transform the score from a first distribution to a second distribution.

In some embodiments, the program may further receive a request for the score from a client device and, in response to the request, provide the score to the client device via a graphical user interface (GUI). The time series data may be a first time series data. The program may further iteratively train the machine learning model using a second time series data and different combinations of subset lengths and numbers of clusters and, based on the training, determine a particular subset length and a particular number of clusters. A length of each subset of data points in the set of subsets of data points may be equal to the particular subset length. A number of clusters in the set of clusters may be equal to the particular number of clusters. The program may further map the set of data to a category. The probability of the occurrence of the event may be a probability of an occurrence of an event for the category.

In some embodiments, a method receives data from a set of data sources. Based on the data, the method further generates a time series data set that includes a plurality of data points. The program also determines a set of subsets of data points from the time series data set. The program further groups the set of subsets of data points into a set of clusters. The program also provides the set of clusters as input to a machine learning model to cause the machine learning model to determine a probability of an occurrence of an event based on the set of clusters.

In some embodiments, the time series data set may be a first time series data set that includes a first plurality of data points. The method may further determine a subset of data points from a second time series data set that includes a second plurality of data points and determine a probability of similarity between the first time series data set and the subset of data points from the second time series data set. The method may further determine a score based on the probability of the occurrence of the event and the probability of similarity between the first time series data set and the subset of the data points from the second time series data set. The method may further transform the score from a first distribution to a second distribution.

In some embodiments, the method may further receive a request for the score from a client device and, in response to the request, provide the score to the client device via a graphical user interface (GUI). The time series data may be a first time series data. The method may further iteratively train the machine learning model using a second time series data and different combinations of subset lengths and numbers of clusters and, based on the training, determine a particular subset length and a particular number of clusters. A length of each subset of data points in the set of subsets of data points may be equal to the particular subset length. A number of clusters in the set of clusters may be equal to the particular number of clusters. The method may further map the set of data to a category, wherein the probability of the occurrence of the event is a probability of an occurrence of an event for the category.

In some embodiments, a system includes a set of processing units and a non-transitory machine-readable medium that stores instructions. The instructions cause at least one processing unit to receive data from a set of data sources. Based on the data, the instructions further cause the at least one processing unit to generate a time series data set that includes a plurality of data points. The instructions also cause the at least one processing unit to determine a set of subsets of data points from the time series data set. The instructions further cause the at least one processing unit to group the set of subsets of data points into a set of clusters. The instructions also cause the at least one processing unit to provide the set of clusters as input to a machine learning model to cause the machine learning model to determine a probability of an occurrence of an event based on the set of clusters.

In some embodiments, the time series data set may be a first time series data set that includes a first plurality of data points. The instructions may further cause the at least one processing unit to determine a subset of data points from a second time series data set that includes a second plurality of data points and determine a probability of similarity between the first time series data set and the subset of data points from the second time series data set. The instructions may further cause the at least one processing unit to determine a score based on the probability of the occurrence of the event and the probability of similarity between the first time series data set and the subset of the data points from the second time series data set. The instructions may further cause the at least one processing unit to transform the score from a first distribution to a second distribution.

In some embodiments, the instructions further cause the at least one processing unit to receive a request for the score from a client device and, in response to the request, provide the score to the client device via a graphical user interface (GUI). The time series data may be a first time series data. The instructions may further cause the at least one processing unit to iteratively train the machine learning model using a second time series data and different combinations of subset lengths and numbers of clusters and, based on the training, determine a particular subset length and a particular number of clusters. A length of each subset of data points in the set of subsets of data points may be equal to the particular subset length. A number of clusters in the set of clusters may be equal to the particular number of clusters.

The following detailed description and accompanying drawings provide a better understanding of the nature and advantages of various embodiments of the present disclosure.

BRIEF DESCRIPTION OF THE DRAWINGS

FIG. 5 illustrates an example graphical user interface (GUI) for providing prediction information according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for predicting events based on time series data. In some embodiments, a computing system receives data (e.g., digital footprint data) from one or more external data sources. Each piece of data can include a time value (e.g., a timestamp) and a numerical value. Based on the received data, the computing system generates a time series data set. Next, the computing system iteratively extracts subsets of contiguous data points from the time series data set that each have the same defined length. The computing system uses a clustering technique to group the extracted subsets of time series data into a defined number of groups. These clusters of subsets of time series data are provided as input to a machine learning model that is configured to predict the probability of an occurrence of an event based on the clusters of subsets of time series data. Then, the computing system compares the original time series data set with another time series data set generated from historical data that resulted in the occurrence of the event and determines a probability that represents the similarity between the two time series data sets. Finally, the computing system determines a score based on the probability output by the machine learning model and the probability representing the similarity between the two time series data sets. The score represents the likelihood that the event will occur.

The techniques described in the present application provide a number of benefits and advantages over conventional methods for predicting events based on time series data. For example, predicting that an event will occur based on the probability of the event happening determined by a machine learning model based on a time series data set and the probability that the time series data set is similar to a historical time series data set in which the event is known to have occurred produces a more accurate prediction. Conventional approaches may examine only the original time series data set to make a prediction.

Figure 1:
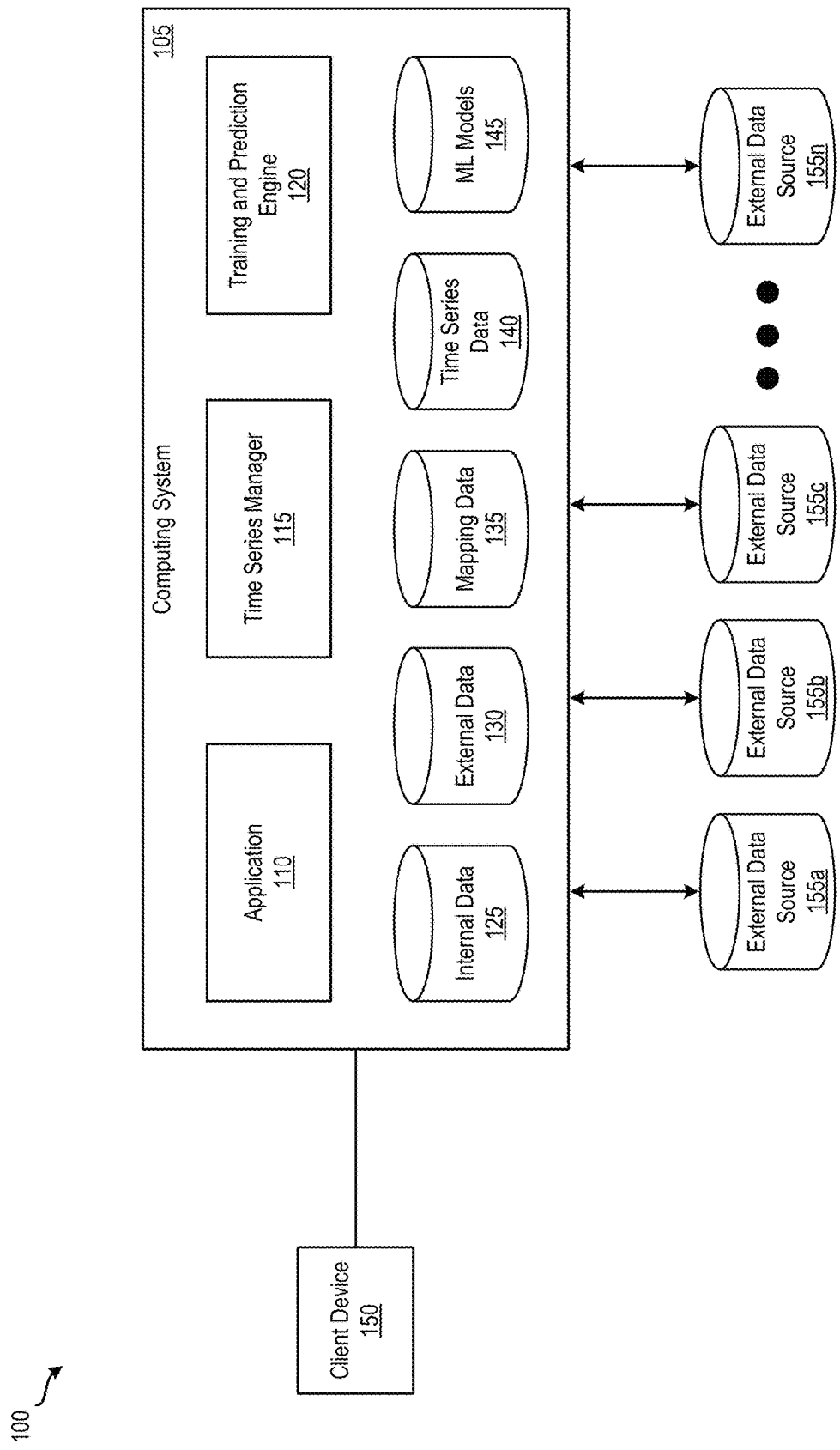
FIG. 1 illustrates a system for predicting events based on time series data according to some embodiments.

FIG. 1 illustrates a system 100 for predicting events based on time series data according to some embodiments. As shown, system 100 includes computing system 105, client device 150, and external data sources 155*a-n*. Client device 150 is configured to communicate and interact with computing system 105. For example, a user of client device 150 may send application 110 a request for prediction information. In response, client device 150 can receive from application 110 the requested prediction information. Each of the external data sources 155*a-n* is configured to store any number of different data. In some embodiments, one or more of the external data sources 155*a-n* are third-party data sources. Examples of data stored in external data sources 155*a-n* include digital footprint data (e.g., email communications, messages posted on websites, messages posted on social media, intent data, clickstream data, install base data), news data, etc. In some embodiments, a piece of data stored in an external data source 155 includes a time value (e.g., a timestamp) and a numerical value. In some cases (e.g., intent data), a piece of data stored in an external data source 155 also includes a topic or keyword and an entity identifier (e.g., a web domain).

Computing system 105 is responsible for predicting events based on time series data. As shown, computing system 105 includes application 110, time series manager 115, training and prediction engine 120, and storages 125-145. Internal data storage 125 stores a variety of different data used to predict events. For example, internal data storage 125 can store firmographics data associated with different entities, taxonomy data (e.g., topics, categories of topics, etc.), product data (e.g., products, product hierarchies, etc.), historical events that occurred in in the past, etc. In some instances, data stored in internal data storage 125 may be used to augment time series data and/or external data. External data storage 130 is configured to store data received from external data sources 155*a-n*. Mapping data storage 135 stores mappings between different types of data. For example, mapping data storage 135 can store mappings between topics and categories, mappings between topics and products, mappings, between products and categories, etc.

Time series data storage 140 is configured to store time series data sets. In some embodiments, a time series data set includes a set of data points that each includes a time attribute (e.g., a date and time attribute) among other attributes. Examples of time series data sets include the price of a stock over a defined window of time (e.g., an hour, a day, a week, etc.), the outside temperature at a particular geographical location over a defined window of time, the utilization of a computing resource (e.g., processor(s), memory, network bandwidth, etc.) over a defined window of time, etc. Machine learning (ML) models storage 145 stores different machine learning models. In some embodiments, a ML model stored in ML models storage 145 is configured to predict the occurrence of a particular event based on time series data. In some embodiments, such an ML model is a classifier. Examples of classifiers can include a random forest model, an extremely randomized tree classifier model, a support vector machine, a Bayes classifier, etc., or any other type of classifier.

In some embodiments, storages 125-145 are implemented in a single physical storage while, in other embodiments, storages 125-145 may be implemented across several physical storages. While FIG. 1 shows storages 125-145 as part of computing system 105, one of ordinary skill in the art will appreciate that internal data storage 125, external data storage 130, mapping data storage 135, time series data storage 140, and/or ML models storage 145 may be external to computing system 105 in some embodiments.

Application 110 is a software application operating on computing system 105 configured to provide prediction information for client device 150. For instance, application 110 may receive from client device 150 a request for prediction information (e.g., a prediction that an event will occur). In response to the request, application 110 forwards it to training and prediction engine 120 for processing. In return, application 110 can receive the requested prediction information from training and prediction engine 120. Application 110 may provide the prediction information to client device 150 via a graphical user interface (GUI).

Time series manager 115 manages time series data sets. For example, time series manager 115 can generate time series data sets based on external data, internal data, and/or mapping data. In some embodiments, time series manager 115 generates time series data sets for a defined window of time (e.g., the most recent two weeks, the most recent month, etc.) at defined intervals (e.g., once a day, once a week, etc.). Time series manager 115 can generate time series data sets in this manner on an entity-by-entity basis, a topic-by-topic basis, a product-by-product basis, a category-by-category basis, etc., or any combination thereof. As an example, for each entity, time series manager 115 may be configured to generate a time series data set for a defined window of time at defined intervals for each category and entity combination.

In some embodiments, time series manager 115 generates a time series data set based on mappings in mappings data storage 135. For instance, if the external data received from external data sources 155*a-n* are data points for different topics, time series manager 115 generates a time series data set for a particular category by retrieving mappings from mappings data storage 135 that map topics to categories and using the mappings to identify data that maps to the particular category (e.g., data points for topics that map to the particular category). Similar techniques can be used to generate time series data sets for products. To merge numerical values of multiple data points at a particular interval in the time series data, time series manager 115 can use any number of different techniques. For example, in some instances, time series manager 115 uses the data point with the highest numerical value as the data point for the particular interval in the time series data set. In other instances, time series manager 115 can calculate the average of the numerical values of all the data points at the particular interval and use the calculated average as the numerical value for the data point at the particular interval.

Time series manager 115 is configured to process requests for time series data sets. For instance, time series manager 115 can receive from training and prediction engine 120 a request for a time series data set (e.g., the most recent data points in a defined window of time for a particular category and a particular entity). In response, time series manager 115 generates the requested time series data set using the methods described above and sends the time series data set to training and prediction engine 120. In some cases, time series manager 115 stores the generated time series data set in time series data storage 140.

In addition, time series manager 115 handles the generation of time series data sets used to train ML models (also referred to as training data sets). For example, time series manager 115 can generate time series data sets based on external data, internal data, and/or mapping data for a defined window of time that led to the occurrence of an event using the same or similar techniques described above. In some cases, time series manager 115 may identify an event that occurred in the past (e.g., stored in internal data storage 125). Then, time series manager 115 access time series data storage 140 to retrieve a corresponding time series data set. For example, if the identified event is associated with a particular category, time series manager 115 accesses time series data storage 140 to retrieve a time series data set for the particular category. Then, time series manager 115 identifies data points in the time series data set that falls within a defined window of time (e.g., four days, three weeks, one month, etc.) that led up to the occurrence of the event and generates the training data set to include these data points. Time series manager 115 stores training data sets that it generates in time series data storage 140.

Figure 2:
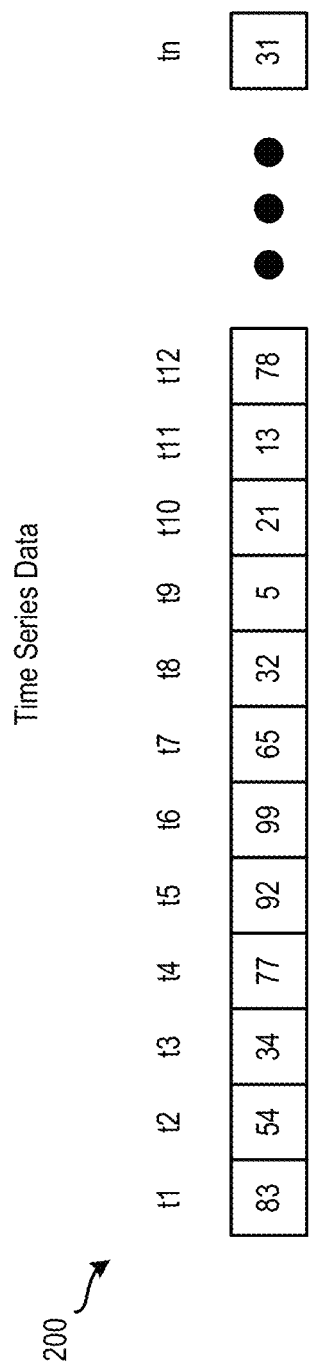
FIG. 2 illustrates an example of time series data set according to some embodiments.

FIG. 2 illustrates an example of time series data set 200 according to some embodiments. As mentioned above, data stored in an external data source 155 can include a time value (e.g., a timestamp) and a numerical value. As shown, time series data set 200 includes n number of data points that each includes a time value and a numerical value. The time values t1, t2, t3, etc. may be a timestamp value. The interval between time values may be the same (e.g., a day, three days, a week, etc.). Each of the numerical values in time series data set 200 can be a value representing a data point or observation of a variable at a point in time indicated by the corresponding time value. For example, time series data set 200 may be a time series data set that time series manager 115 generated based on intent data received from an external data source 155. Each piece of the received intent data includes a timestamp, a topic, an entity identifier, and a score representing an amount of interest in the topic by the entity associated with the entity identifier. In such an example, time series data set 200 may be a time series data set of the scores for the topic and the entity.

Returning to FIG. 1, training and prediction engine 120 is configured to train ML models. In some embodiments, training and prediction engine 120 uses a time series data set (e.g., a training data set generated by time series manager 115) to train an ML model. To train an ML model based on a time series data set, training and prediction engine 120 starts by iteratively extracting subsets of contiguous data points from the time series data set. Each of the extracted subsets of data points may have the same defined length. That is, each of the subsets can have the same number of data points. These subsets of data points can also be referred to as time patterns and the number of data points in a time pattern can also be referred to as a time pattern length.

Figure 3:
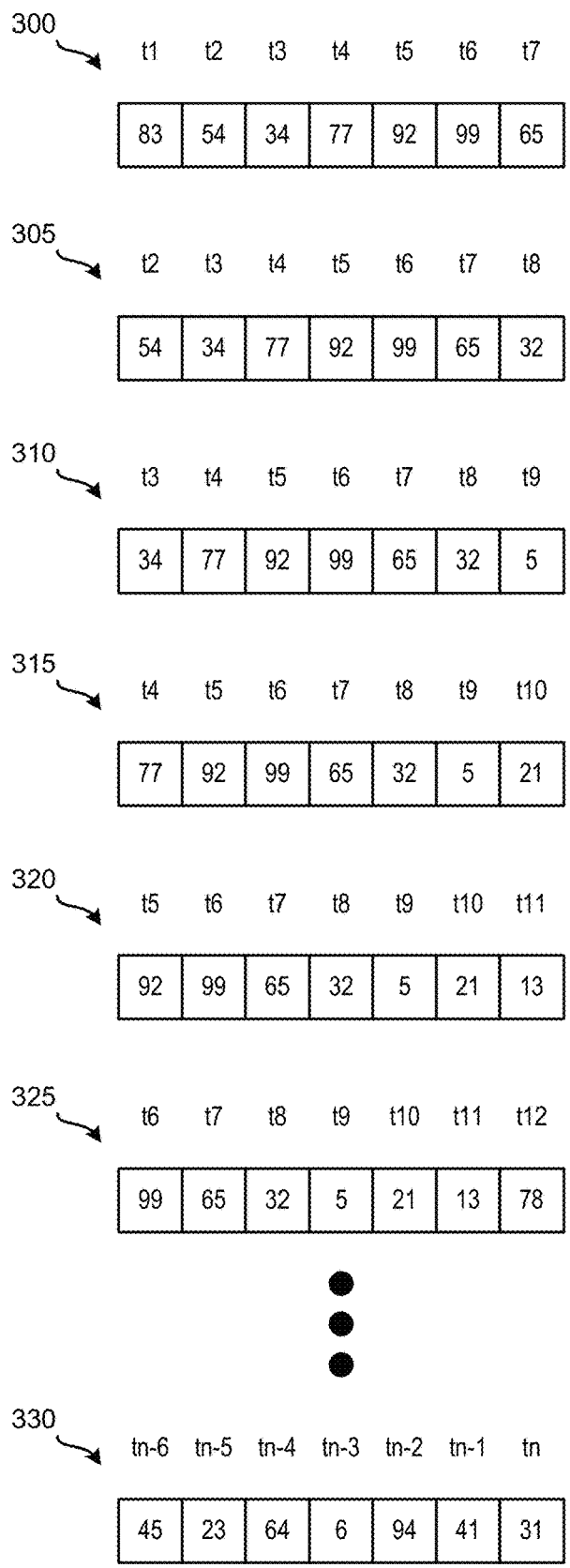
FIG. 3 illustrates an example of time patterns extracted from the time series data set illustrated in FIG. 2 according to some embodiments.

FIG. 3 illustrates an example of time patterns extracted from time series data set 200 illustrated in FIG. 2 according to some embodiments. Specifically, for this example, training and prediction engine 120 extracts time patterns 300-330 from time series data set 200 that have a time pattern length of seven. As shown, time pattern 300 that training and prediction engine 200 extracts from time series data set 200 includes the first seven data points in time series data set 200 (i.e., t1-t7). For time pattern 305, training and prediction engine 120 starts at the second data point in time series data set 200 and extracts seven data points from time series data set 200 (i.e., t2-t8). Training and prediction engine 120 proceeds to the third data point in time series data set 200 and extracts seven data points from it (i.e., t3-t9). Training and prediction engine 120 iterates through time series data set 200 and continues to extract time patterns with a length of seven until a time pattern includes the last data point (tn for this example), which is time pattern 330 in this example.

Returning to FIG. 1, training and prediction engine 120 groups the subsets of data points into a defined number of groups (also referred to as the number of clusters). In some embodiments, training and prediction engine 120 uses a k-means clustering algorithm to group the subsets of data points into the defined number of groups (also referred to as clusters). The training and prediction engine 120 provides the clusters of subsets of data as well as the number of subsets in each cluster as inputs to the ML model. In response, the ML model outputs a probability (e.g., a value between 0 and 1) of an occurrence of an event. Training and prediction engine 120 repeatedly trains the ML model in this manner using different combinations of time pattern lengths and numbers of clusters. The values for the different time pattern lengths can be selected from a defined range of time pattern length values. Similarly, the values for the number of clusters may be selected from a defined range of number of cluster values. Once training and prediction engine 120 has performed this process for different combinations of time pattern lengths and numbers of cluster, training and prediction engine 120 selects the combination of time pattern length and number of clusters that caused the ML model to produce the most accurate prediction (e.g., the ML model produced the highest probability of an occurrence of an event, the ML model satisfies one or more information theory metrics such as maximum entropy, etc.). The selected time pattern length and number of clusters will be used when the ML model is used to perform inference. Training and prediction engine 120 stores the ML model, the selected time pattern length, and the selected number of clusters in ML models storage 145.

Training and prediction engine 120 is also configured to use trained ML models for inference in order to predict the occurrence of events. For example, training and prediction engine 120 may receive from application 110 a request for prediction information (e.g., a prediction that an event will occur). To predict a probability of an occurrence of an event based on a time series data set (e.g., the most recent data points in a defined window of time for a particular category and a particular entity), training and prediction engine 120 sends time series manager 115 for the time series data set. Upon receiving the requested time series data set, training and prediction engine 120 accesses time series data storage 140 to retrieve selected time pattern length and the selected number of clusters determined during training of the ML model. Then, training and prediction engine 120 iteratively extracts subsets of contiguous data points from the time series data set that have the selected time pattern length. Next, training and prediction engine 120 groups the subsets of data points into the selected number of clusters. In some embodiments, training and prediction engine 120 uses a k-means clustering algorithm to group the subsets of data points into clusters. Training and prediction engine 120 then provides the clusters and the number of subsets in each cluster (referred collectively as a cluster model) as inputs to the ML model. In response, the ML model outputs a probability (e.g., a value between 0 and 1) of an occurrence of an event. Using this approach, the probability of occurrence is not restricted by the whole time series data set but by the set of the subsets of extracted data points over the window of time that the time series data set spans. In addition, the sequential ordering of all the subsets of extracted data will not restrict the prediction too strongly. Rather, the number of occurrences of these subsets of extracted data influences the prediction.

After using the ML model to produce a probability of an occurrence of an event, training and prediction engine 120 generates another probability that represents the similarity between the time series data set and another time series data set that led to the occurrence of the event (also referred to as an optimal time series data set). To determine the optimal time series data set, training and prediction engine 120 may identify an event that occurred in the past (e.g., stored in internal data storage 125) and then access time series data storage 140 to retrieve a corresponding time series data set. Next, training and prediction engine 120 identifies data points in the time series data set that falls within a defined window of time (e.g., four days, three weeks, one month, etc.) that led up to the occurrence of the event and generates a candidate time series data set to include these data points. Then, training and prediction engine 120 selects one of the candidate time series data sets as the optimal time series data set. In some embodiments, training and prediction engine 120 selects the candidate time series data set that has the highest sum of the numerical values in the time series data set. Referring to FIG. 2 as an example, to calculate the sum of the numerical values in time series data set 200, training and prediction engine 120 would add the values 83, 54, 34, 77, 92, . . . , and 31 together. Training and prediction engine 120 can use different techniques to determine the similarity between two time series data sets. For example, in some embodiments, training and prediction engine 120 uses an algorithm that determines similarity based on the Euclidean distance between corresponding data points in the two time series data sets. In other embodiments, training and prediction engine 120 uses a dynamic time warping algorithm to determine the similarity between two time series data sets. The determined similarity between the two time series data sets may be represented by a probability/similarity value (e.g., a value between 0 and 1).

In some embodiments, training and prediction engine 120 determines the similarity between the time series data set and the optimal time series data set by comparing the most recent time pattern in the time series data set with the optimal time series data set. Referring to FIGS. 2 and 3 as an example, if training and prediction engine 120 determines the similarity between time series data set 200 and an optimal time series data set, training and prediction engine 120 may compare time pattern 330 to the optimal series data set.

Once training and prediction engine 120 determines a probability predicted by the ML model and a probability of the similarity between the time series data set and an optimal time series data set, training and prediction engine 120 determines a score based on these probabilities. In some embodiments, training and prediction engine 120 determines the score by calculating the average of the two probabilities. Training and prediction engine 120 can also perform some normalization operations on the calculated average. For instance, training and prediction engine 120 can normalize the distribution of the calculated average by transforming the distribution of the calculated average to a uniform distribution. Finally, training and prediction engine 120 sends the determined score to application 110.

Figure 4:
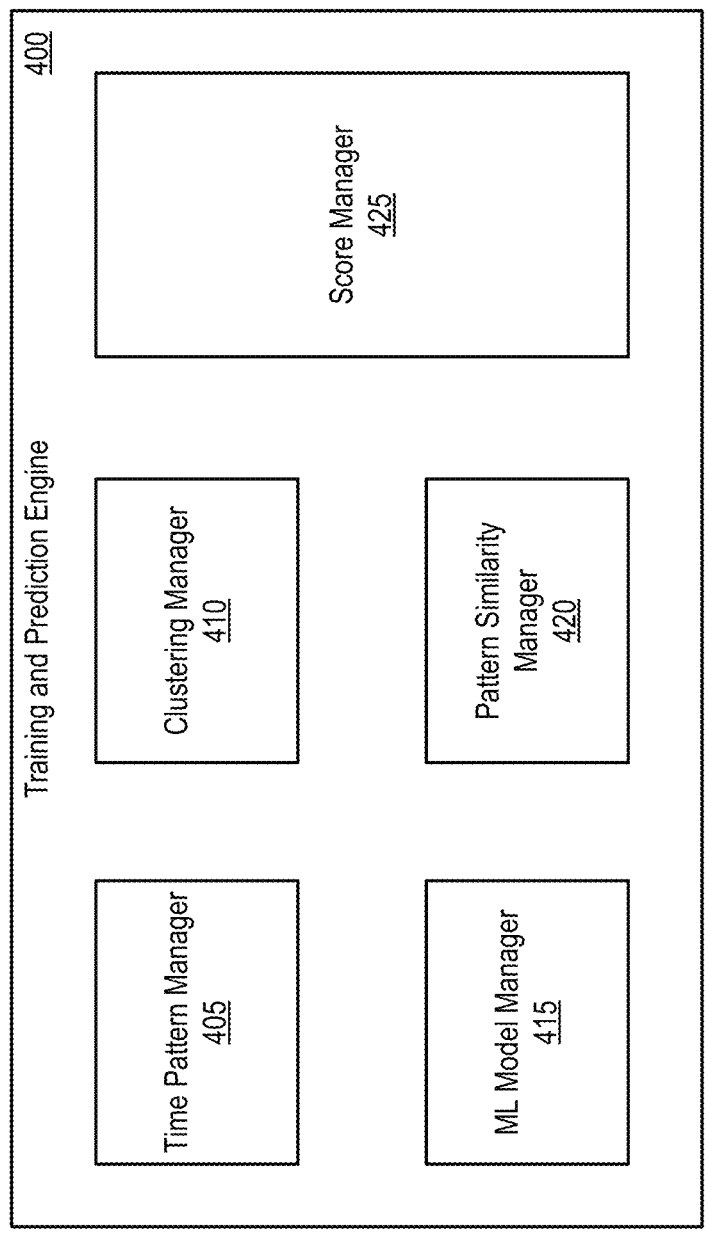
FIG. 4 illustrates a training and prediction engine according to some embodiments.

FIG. 4 illustrates a training and prediction engine 400 according to some embodiments. In some embodiments, training and prediction engine 400 can be used to implement training and prediction engine 120. As shown, training and prediction engine 400 includes time pattern manager 405, clustering manager 410, ML model manager 415, pattern similarity manager 420, and score manager 425. Time pattern manager 405 is responsible for managing time patterns. For instance, time pattern manager 405 can extract time patterns that have a defined length from a time series data set for training an ML model. Time pattern manager 405 may also extract time patterns that have a selected time pattern length (e.g., retrieved from ML models storage 145) from a time series data set when using an ML model for inference. As an example of time pattern extraction, time pattern manager 405 can handle the extraction of time patterns 300-330 from time series 200, as illustrated in FIG. 3. After extracting time patterns from a time series data set, time pattern manager 405 sends them to clustering manager 410.

Clustering manager 410 is configured to group time patterns into a defined number of clusters. For example, clustering manager 410 may receive time patterns from time pattern manager 405. In response, clustering manager 410 groups the received time patterns into a defined number of clusters. In some instances, the defined number of clusters can be a number of clusters being used in an iteration of training an ML model. In other instances, the defined number of clusters is a number of clusters determined to be used when using an ML model for inference. In some embodiments, clustering manager 410 utilizes a k-means clustering algorithm to group the time patterns into the defined number of clusters. Once clustering manager 410 groups the time patterns into clusters, clustering manager 410 sends ML model manager 415 the clusters and the number of time patterns in each cluster.

ML model manager 415 performs operations associated with the management of ML models. For instance, ML model manager 415 may receive from clustering manager 410 a set of clusters of time patterns and the number of time patterns in each cluster. If the clusters are for training an ML model, ML manager 415 retrieves the ML model from ML models storage 145. Then, ML model manager 415 provides the set of clusters of time patterns and the number of time patterns in each cluster as inputs to the ML model to train it. ML model manager 415 manages the output generated by the ML model (e.g., by storing them in ML models storage 145). ML model manager 415 performs the same or similar operations for other clusters during training of the ML model. Once all the different permutations are processed by time pattern manager 405, clustering manager 410, and ML model manager 415, ML model manager 415 selects the combination of time pattern length and number of clusters that caused the ML model to produce the most accurate prediction and stores them in ML models storage 145. For cases where the clusters are for using an ML model for inference, ML manager 415 retrieves the ML model from ML models storage 145 and provides the set of clusters of time patterns and the number of time patterns in each cluster as inputs to the ML model. Based on the inputs, the ML model generates a probability of an occurrence of an event. ML models manager 145 sends the probability value to score manager 425. In some embodiments, the ML model also outputs a list of the factors that contributed to the probability. In some such embodiments, ML model manager 420 also sends the list to score manager 425. Different techniques can be used to determine the list of factors contributing to a probability. In some cases, the ML model determines the list of factors by determining a defined number of clusters that contributing the most to the probability and using the factors (e.g., topics) associated with determined clusters as the list of factors. In other cases, an ML prediction explanation technique such as a Shapley Additive Explanations (SHAP) technique, a LIME technique, etc., may be used to determine the list of factors.

Pattern similarity manager 420 is configured to determine similarities between time series data sets. For example, when an ML model is used for inference to predict the likelihood that an event will occur based on a time series data set, pattern similarity manager 420 can compare the time series data set (e.g., the time series data set from which time pattern manager 405 used to extract time patterns) with an optimal time series data set. Pattern similarity manager 420 determines the optimal time series data set using the same or similar techniques described above. In particular, pattern similarity manager 420 determines the optimal time series data set to be the same length as the time series data set. Pattern similarity manager 420 can use any number of different techniques to determine the similarity between two time series data sets. For instance, in some embodiments, pattern similarity manager 420 uses a dynamic time warping algorithm to determine the similarity between two time series data sets. In other embodiments, pattern similarity manager 420 employs an algorithm that determines similarity based on the Euclidean distance between corresponding data points in the two time series data sets. Regardless of the method utilized, the determined similarity between the two time series data sets is represented by a probability/similarity value (e.g., a value between 0 and 1). Pattern similarity manager 420 sends the probability value to score manager 425.

Score manager 425 is responsible for determining scores for times series data sets. For instance, score manager 425 may receive a probability value from ML model manager 415 and a probability value from pattern similarity manager 420. In response to receiving these values, score manager 425 calculates an average between the two values in some embodiments. score manager 425 can employ different calculations instead of calculating an average between these two values. For example, score manager 425 may calculate a weighted average of the two values based on defined weight values. In addition, score manager 425 may perform a set of normalization operations on the calculated average. For example, in some cases, score manager 425 can normalize the distribution of the calculated average by transforming the distribution of the calculated average to a uniform distribution. Score manager 425 sends the determined score to application 110. For instances where score manager 425 also receives from ML model manager 420 a list of factors contributing to the score, score manager 425 also provides this to application 110.

FIG. 5 illustrates an example GUI 500 for providing prediction information according to some embodiments. For this example, application 100 provides GUI 500 to client device 150 in response to receiving from client device 150 a request for prediction information associated seven different categories A-G for an entity (Entity C in this example). In response to receiving this request, application 110 forwards it to training and prediction engine 120. Training and prediction engine 120 uses an ML model trained according to the methods described above to determine a score for each of the categories A-G that is associated with Entity C. In this example, training and prediction engine 120 determines a score for each of the categories A-G is based on intent data received from external data sources 155a-n using the techniques described above. Each piece of the intent data includes a timestamp, a topic, an entity identifier (www.entityc.com for this example) for Entity C, zero or more vendors, and a score representing an amount of interest in the topic by the entity associated with the entity identifier.

As shown, GUI 500 includes display areas 505-520. Display area 505 is configured to display a score associated with a category selected in display area 510. Here, category A is selected in display area 510, as indicated by a gray highlight of the bar for category A. The score of 92 for category A represents a predicted 92% probability that an event will occur (e.g., the probability that a lead, opportunity, and/or deal will be created for a product associated with category A). As depicted in FIG. 5, display area 510 provides a set of categories (categories A-G in this example) and the corresponding score for each category. Display area 515 is configured to provide a defined number (five in this example) of the top factors that contributed to the selected score. As mentioned, this information can be provided by the ML model used to predict the likelihood that the event will occur. Here, the factors are topics. Thus, display area 515 provides a defined number of the top topics that contributed to the selected score. Display area 520 provides a defined number (five in this example) of other top factors that contributed to the selected score. These information may also be provided by the ML model used to predict the likelihood that the event will occur. For this example, this second set of factors are vendors.

Figure 6:
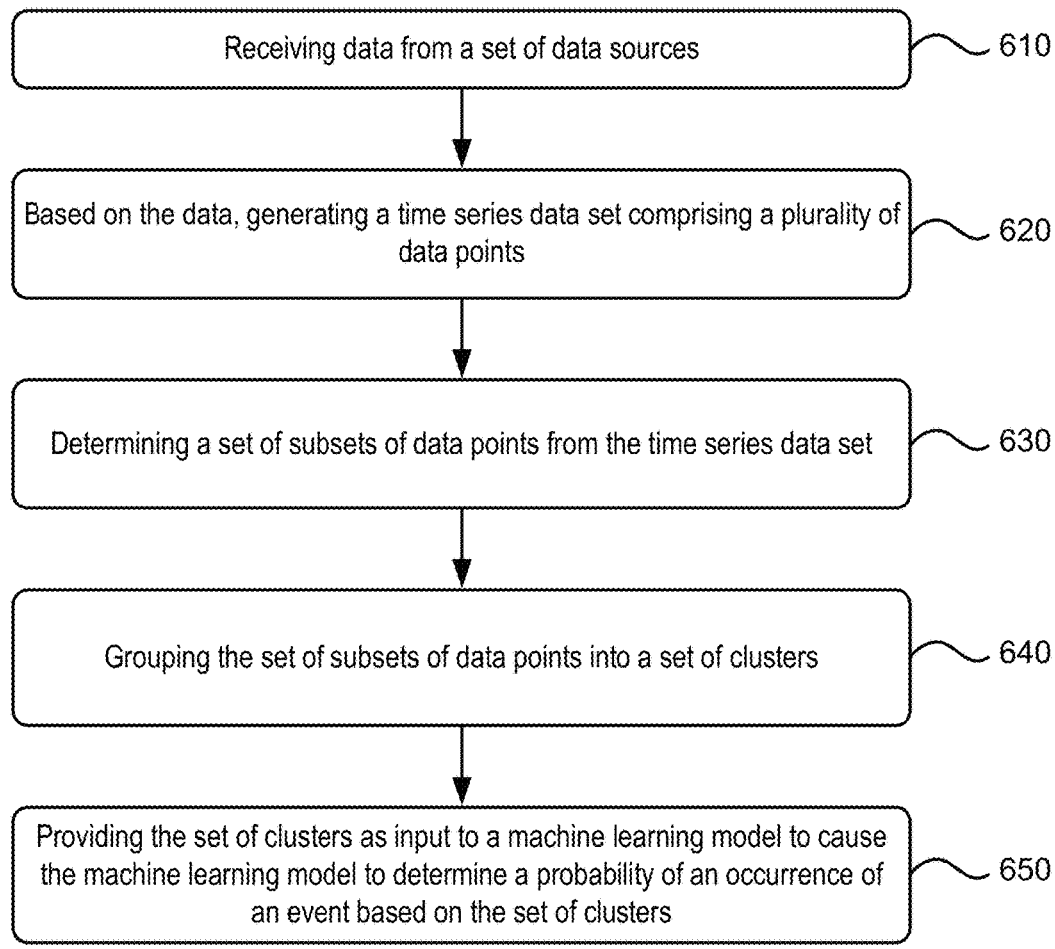
FIG. 6 illustrates a process for predicting events based on time series data according to some embodiments.

FIG. 6 illustrates a process 600 for predicting events based on time series data according to some embodiments. In some embodiments, computing system 105 performs process 600. Process 600 begins by receiving, at 610, data from a set of data sources. Referring to FIG. 1 as an example, computing system 105 may receive the data from external data sources 155a-n.

Based on the data, process 600 then generates, at 620, a time series data set comprising a plurality of data points. Referring to FIGS. 1 and 2 as an example, time series manager 115 can generate time series data set 200 based on data received from external data sources 155a-n. Time series manager 115 may retrieve the data from external data storage 130.

Next, process 600 determines, at 630, a set of subsets of data points from the time series data set. Referring to FIGS. 1-3 as an example, training and prediction engine 120 may extract time patterns from time series data set 200, such as those illustrated in FIG. 3. At 640, process 600 groups the set of subsets of data points into a set of clusters. Referring to FIG. 1 as an example, training and prediction engine 120 can group the time patterns into a defined number of clusters.

For instance, training and prediction engine 120 uses a k-means clustering algorithm to group the time patterns in some embodiments.

Finally, process 600 provides, at 650, the set of clusters as input to a machine learning model to cause the machine learning model to determine a probability of an occurrence of an event based on the set of clusters. Referring to FIG. 1 as an example, training and prediction engine 120 provides the set of clusters as input to an ML model. In some instances, training and prediction engine 120 also provides the number of time patterns in each cluster as input to the ML model. The ML model outputs a probability of an occurrence of an event.

Figure 7:
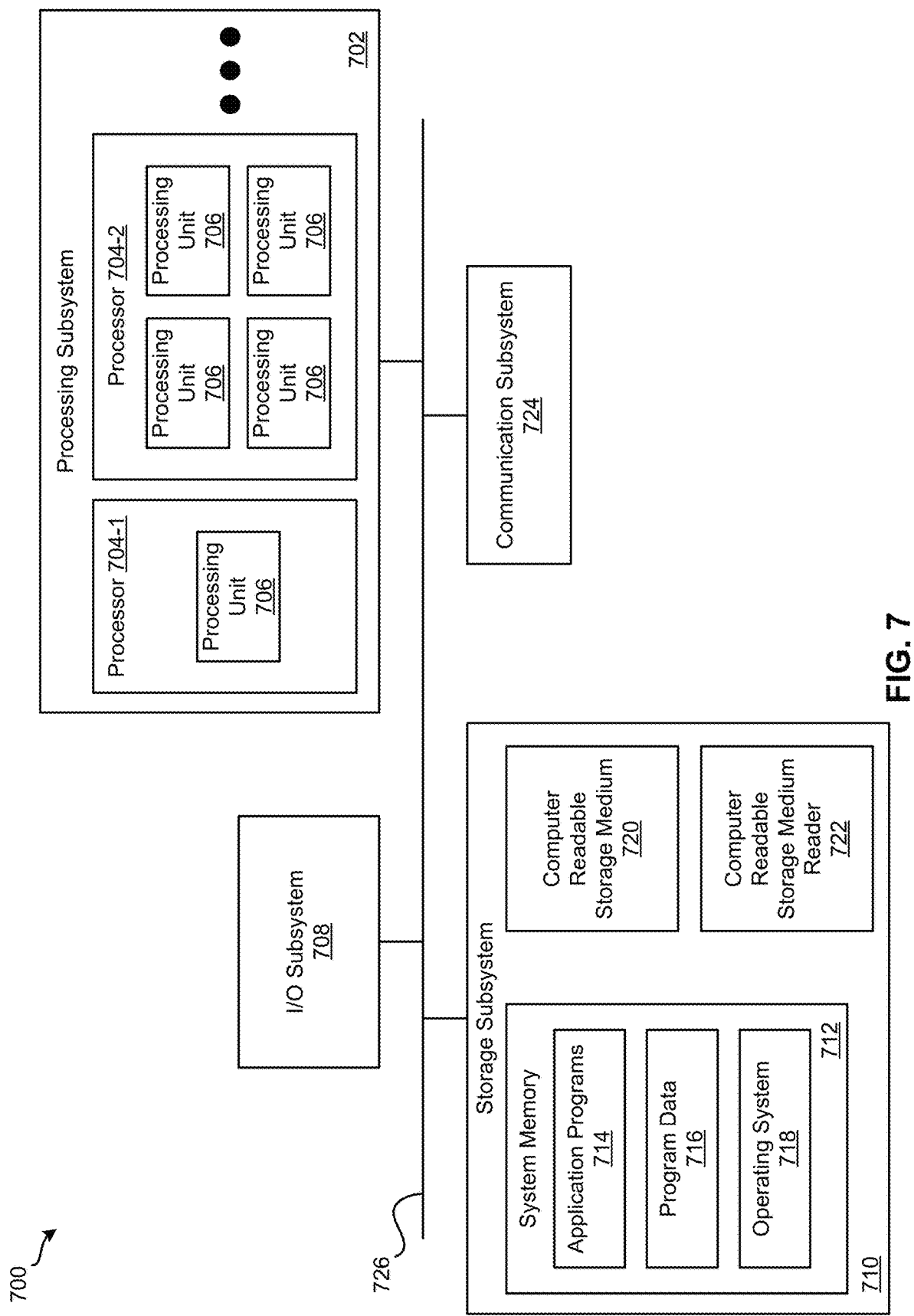
FIG. 7 illustrates an exemplary computer system, in which various embodiments may be implemented.

FIG. 7 illustrates an exemplary computer system 700 for implementing various embodiments described above. For example, computer system 700 may be used to implement computing system 105 and client device 105. Computer system 700 may be a desktop computer, a laptop, a server computer, or any other type of computer system or combination thereof. Some or all elements of application 110, time series manager 115, training and prediction engine 120, time pattern manager 405, clustering manager 410, ML model manager 415, pattern similarity manager 420, score manager 425, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 110), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., application 110, time series manager 115, training and prediction engine 120, time pattern manager 405, clustering manager 410, ML model manager 415, pattern similarity manager 420, and score manager 425) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
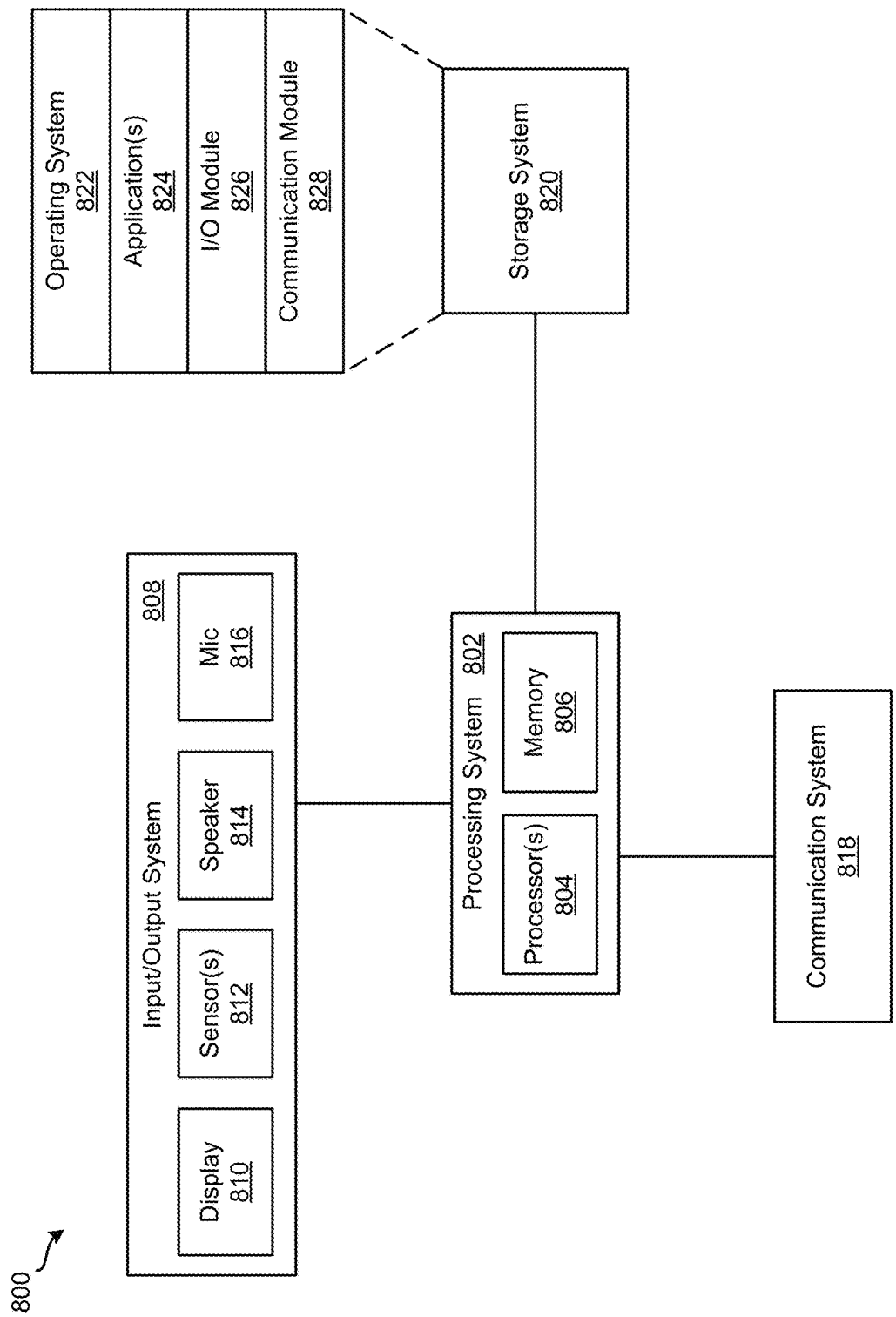
FIG. 8 illustrates an exemplary computing device, in which various embodiments may be implemented.

FIG. 8 illustrates an exemplary computing device 800 for implementing various embodiments described above. For example, computing device 800 may be used to implement client device 150. Computing device 800 may be a cellphone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
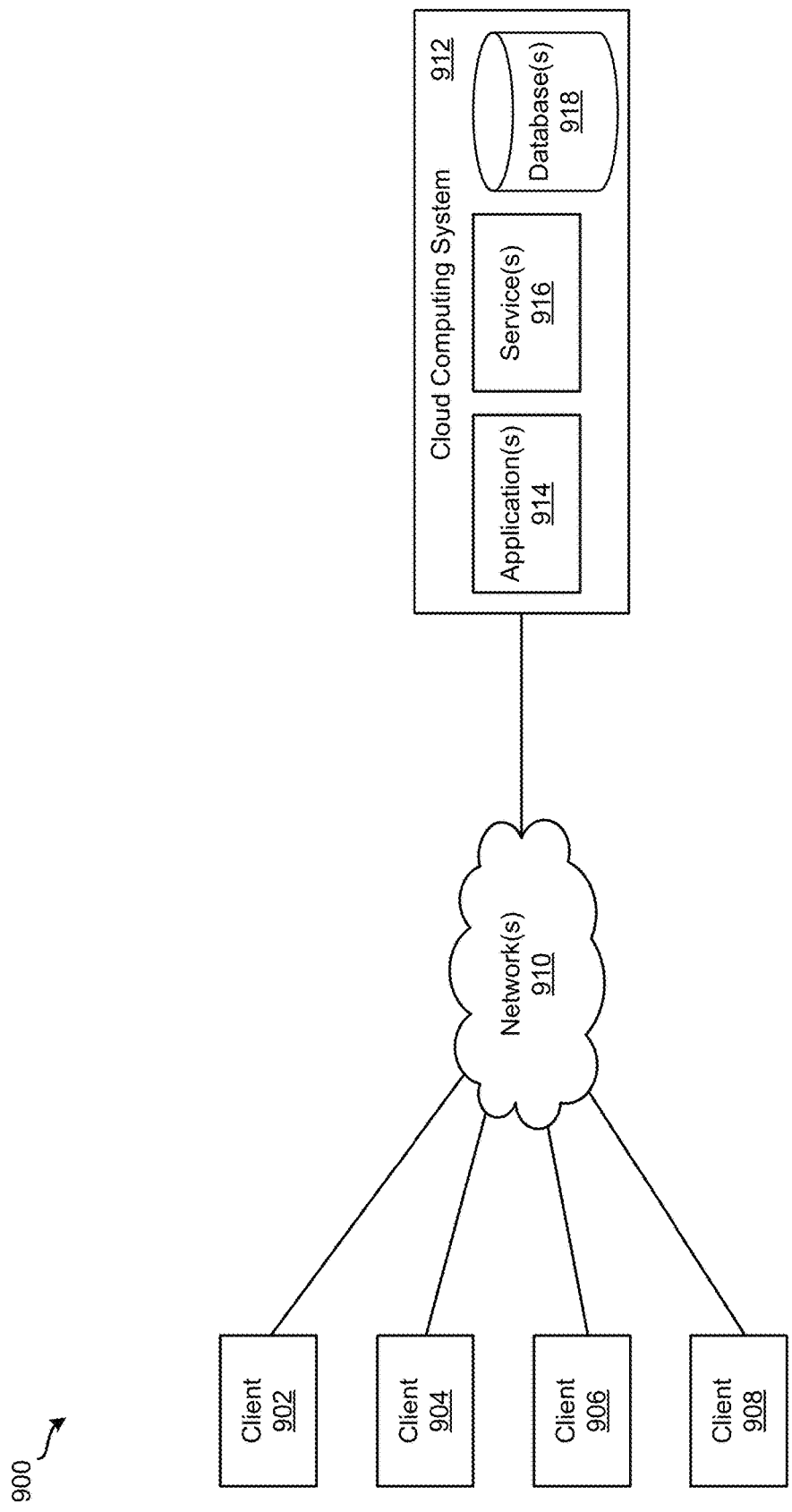
FIG. 9 illustrates an exemplary system, in which various embodiments may be implemented.

FIG. 9 illustrates an exemplary system 900 for implementing various embodiments described above. For example, any one of client devices 902-908 may be used to implement client device 150 and cloud computing system 912 may be used to implement computing system 105. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 912 is referred to as a "cloud service." Typically, servers and systems that make up cloud computing system 912 are different from the on-premises servers and systems of a customer. For example, cloud computing system 912 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 125-145 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving data from a set of data sources;
   based on the data, generating a first time series data set comprising a plurality of data points, each data point of the first time series data set comprising a time value and a numeric value, wherein an interval between each time value is equal, and wherein the first time series data set falls within a defined window of time;

retrieving a pre-determined length and a pre-determined number of clusters from a memory;

determining a set of subsets of data points from the first time series data set, each subset of data points having the pre-determined length;

grouping the set of subsets of data points into a set of clusters comprising the pre-determined number of clusters;

providing the set of clusters as input to a machine learning model to cause the machine learning model to determine a probability of an occurrence of an event based on the set of clusters;

determining a second time series data set comprising a second plurality of data points that led to the occurrence of the event, wherein the second time series data set is selected from a plurality of candidate time series data sets that led to the occurrence of the event and fall within a same size window of time, the second time series data set having a highest sum of numerical values of the plurality of candidate time series data sets;

determining a similarity probability between the first time series data set and the subset of data points from the second time series data set;

determining a score based on the probability of the occurrence of the event and the similarity probability; and providing the score to a client device via a graphical user interface (GUI), wherein the program further comprises sets of instructions for:

iteratively training the machine learning model using a third time series data set formed into different combinations of subset lengths and numbers of clusters;

based on the training, determining a particular subset length and a particular number of clusters producing a most accurate prediction; and storing the particular subset length as the pre-determined length and the particular number of clusters as the pre-determined number of clusters.

2. The non-transitory machine-readable medium of claim 1, wherein the program further comprises a set of instructions for transforming the score from a first distribution to a second distribution.

3. The non-transitory machine-readable medium of claim 1, wherein the program further comprises a set of instructions for mapping the first time series data set to a category, wherein the probability of the occurrence of the event is a probability of an occurrence of an event for the category.

4. A method comprising:

receiving data from a set of data sources;

based on the data, generating a first time series data set comprising a plurality of data points, each data point of the first time series data set comprising a time value and a numeric value, wherein an interval between each time value is equal, and wherein the first time series data set falls within a defined window of time;

retrieving a pre-determined length and a pre-determined number of clusters from a memory;

determining a set of subsets of data points from the first time series data set, each subset of data points having the pre-determined length;

grouping the set of subsets of data points into a set of clusters comprising the pre-determined number of clusters;

providing the set of clusters as input to a machine learning model to cause the machine learning model to determine a probability of an occurrence of an event based on the set of clusters;

determining a second time series data set comprising a second plurality of data points that led to the occurrence of the event, wherein the second time series data set is selected from a plurality of candidate time series data sets that led to the occurrence of the event and fall within a same size window of time, the second time series data set having a highest sum of numerical values of the plurality of candidate time series data sets;

determining a similarity probability between the first time series data set and the subset of data points from the second time series data set;

determining a score based on the probability of the occurrence of the event and the similarity probability; and providing the score to a client device via a graphical user interface (GUI), wherein the program further comprises sets of instructions for:

iteratively training the machine learning model using a third time series data set formed into different combinations of subset lengths and numbers of clusters;

based on the training, determining a particular subset length and a particular number of clusters producing a most accurate prediction; and storing the particular subset length as the pre-determined length and the particular number of clusters as the pre-determined number of clusters.

5. The method of claim 4 further comprising transforming the score from a first distribution to a second distribution.

6. The method of claim 4 further comprising mapping the first time series data set to a category, wherein the probability of the occurrence of the event is a probability of an occurrence of an event for the category.

7. A system comprising:

a set of processing units; and a non-transitory machine-readable medium storing instructions that when executed by at least one processing unit in the set of processing units cause the at least one processing unit to:

receiving data from a set of data sources;

based on the data, generating a first time series data set comprising a plurality of data points, each data point of the first time series data set comprising a time value and a numeric value, wherein an interval between each time value is equal, and wherein the first time series data set falls within a defined window of time;

retrieve a pre-determined length and a pre-determined number of clusters from a memory;

determine a set of subsets of data points from the first time series data set, each subset of data points having the pre-determined length;

group the set of subsets of data points into a set of clusters comprising the pre-determined number of clusters;

provide the set of clusters as input to a machine learning model to cause the machine learning model to determine a probability of an occurrence of an event based on the set of clusters;

determine a second time series data set comprising a second plurality of data points that led to the occurrence of the event, wherein the second time series data set is selected from a plurality of candidate time series data sets that led to the occurrence of the event and fall within a same size window of time, the second time series data set having a highest sum of numerical values of the plurality of candidate time series data sets;

determine a similarity probability between the first time series data set and the subset of data points from the second time series data set;

determine a score based on the probability of the occurrence of the event and the similarity probability; and provide the score to a client device via a graphical user interface (GUI), wherein the instructions further cause the at least one processing unit to:

iteratively train the machine learning model using a third time series data set formed into different combinations of subset lengths and numbers of clusters;

based on the training, determine a particular subset length and a particular number of clusters producing a most accurate prediction; and store the particular subset length as the pre-determined length and the particular number of clusters as the pre-determined number of clusters.

8. The system of claim 7, wherein the instructions further cause the at least one processing unit to transform the score from a first distribution to a second distribution.

\* \* \* \* \*